United States Patent
Kim et al.

(10) Patent No.: US 11,502,875 B2
(45) Date of Patent: Nov. 15, 2022

(54) METHOD FOR MEASURING CHANNEL BETWEEN TERMINALS IN WIRELESS COMMUNICATION SYSTEM, AND DEVICE THEREFOR

(71) Applicant: LG ELECTRONICS INC., Seoul (KR)

(72) Inventors: Heejin Kim, Seoul (KR); Youngtae Kim, Seoul (KR); Jiwon Kang, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 620 days.

(21) Appl. No.: 16/486,147

(22) PCT Filed: Feb. 15, 2017

(86) PCT No.: PCT/KR2017/001628
§ 371 (c)(1),
(2) Date: Aug. 14, 2019

(87) PCT Pub. No.: WO2018/151340
PCT Pub. Date: Aug. 23, 2018

(65) Prior Publication Data
US 2020/0235961 A1   Jul. 23, 2020

(51) Int. Cl.
*H04L 25/02* (2006.01)
*H04W 76/11* (2018.01)
(Continued)

(52) U.S. Cl.
CPC ........ *H04L 25/0226* (2013.01); *H04L 5/0051* (2013.01); *H04W 24/10* (2013.01); *H04W 72/0446* (2013.01); *H04W 76/11* (2018.02)

(58) Field of Classification Search
CPC .. H04L 25/0226; H04L 5/0051; H04W 76/11; H04W 24/10; H04W 72/0446
(Continued)

(56) References Cited

U.S. PATENT DOCUMENTS 9,154,267 B2 * 10/2015 He .................... H04W 52/383
2011/0171964 A1 * 7/2011 Lin .................... H04L 5/0023
455/450
(Continued)

OTHER PUBLICATIONS

PCT International Application No. PCT/KR2017/001628, International Search Report dated Feb. 15, 2017, 5 pages.
(Continued)

*Primary Examiner* — Chi Tang P Cheng
(74) *Attorney, Agent, or Firm* — Lee, Hong, Degerman, Kang & Waimey PC

(57) ABSTRACT

The present invention provides a method for measuring a channel between terminals in a wireless communication system, and a device for the method. Particularly, a method for a first terminal to measure a channel in a wireless communication system may comprise: a step of transmitting, to a base station, a first message requesting sounding reference signal (SRS) configuration information associated with a second terminal; a step of receiving, from the base station, a second message including at least one of the SRS configuration information associated with the second terminal and identification information of the second terminal; a step of receiving at least one SRS from the second terminal, by using an SRS configuration associated with the second terminal identified based on the received second message; and a step of measuring a channel with the second terminal by using the received at least one SRS.

14 Claims, 8 Drawing Sheets

(51) Int. Cl.
*H04L 5/00* (2006.01)
*H04W 24/10* (2009.01)
*H04W 72/04* (2009.01)

(58) Field of Classification Search
USPC .......................................................... 370/329
See application file for complete search history.

(56) References Cited

U.S. PATENT DOCUMENTS

| | | | |
|---|---|---|---|
| 2013/0100833 A1* | 4/2013 | Xu | H04J 13/0062 370/252 |
| 2014/0274196 A1 | 9/2014 | Dai et al. | |
| 2014/0328299 A1* | 11/2014 | Kalhan | H04W 72/042 370/329 |

OTHER PUBLICATIONS

LG Electronics, "Considerations on NR SRS design," 3GPP TSG-RAN WG1 #88, R1-1702465, Feb. 2017, 6 pages.

ZTE, "Discussion on SRS design for NR," 3GPP TSG-RAN WG1 #88, R1-1701818, Feb. 2017, 5 pages.

\* cited by examiner

[FIG. 1]
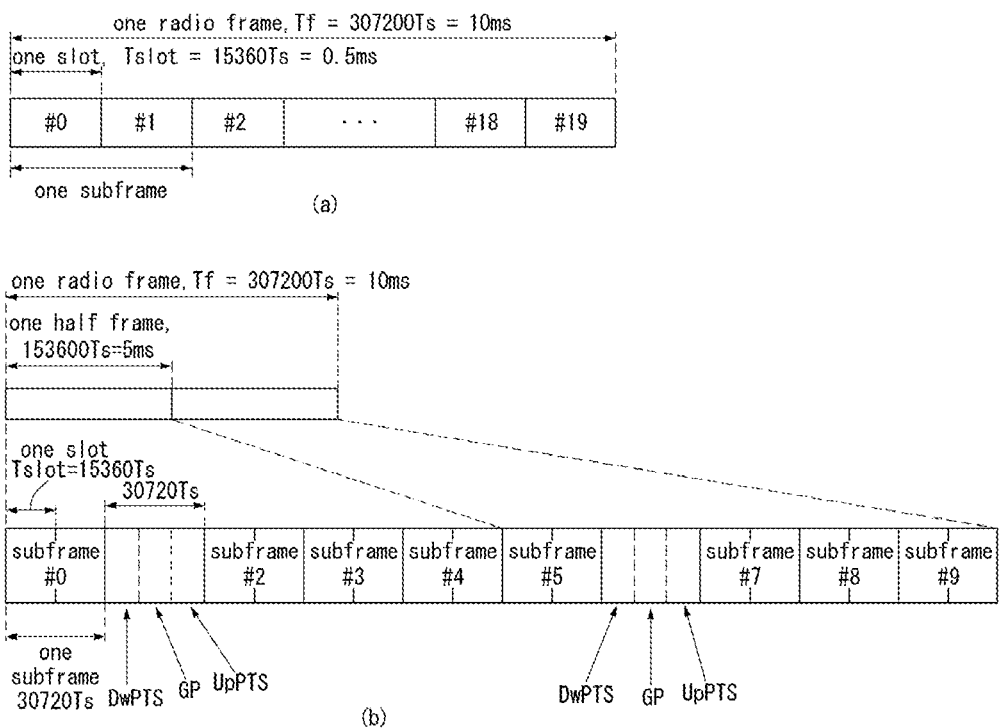

[FIG. 2]
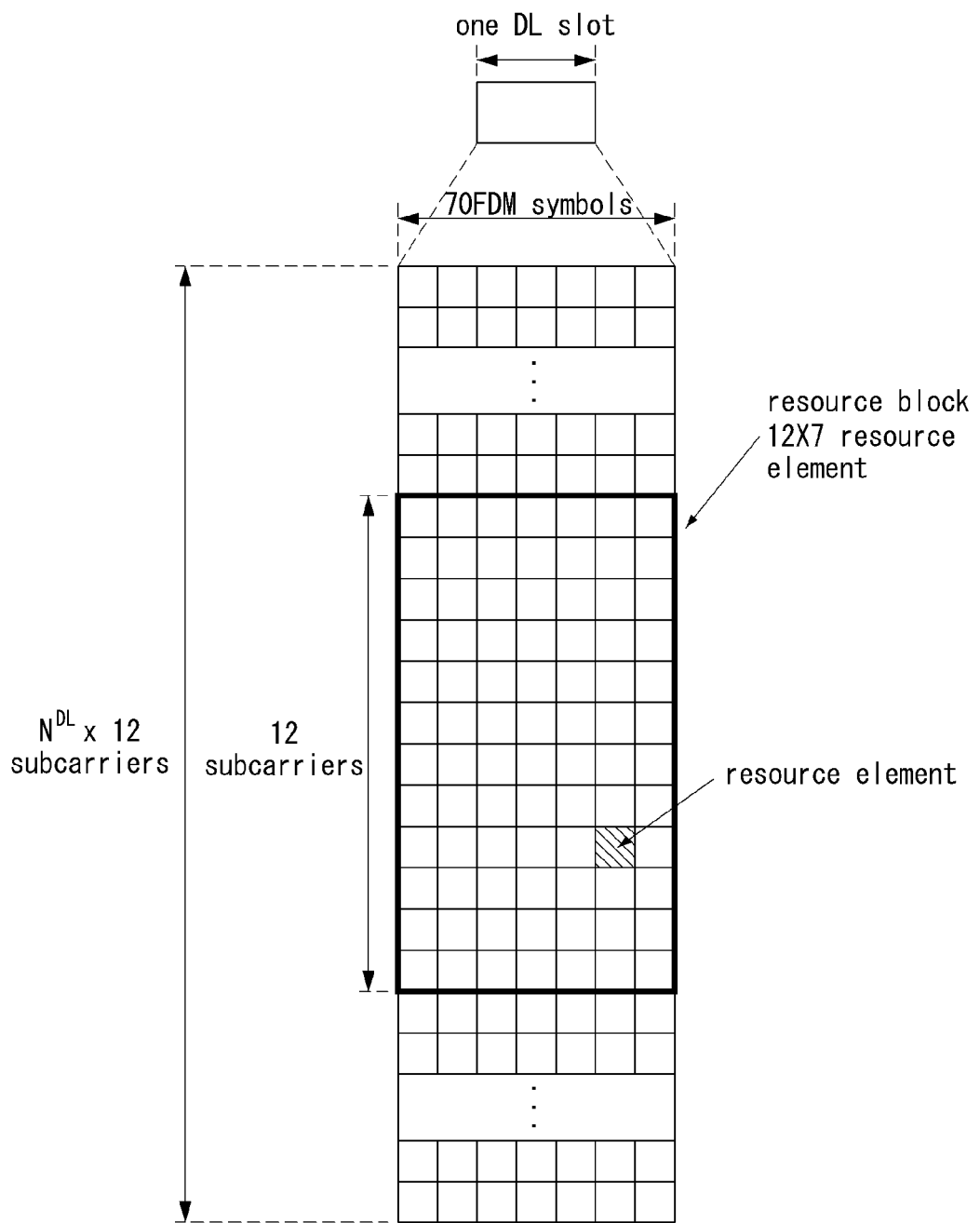

[FIG. 3]
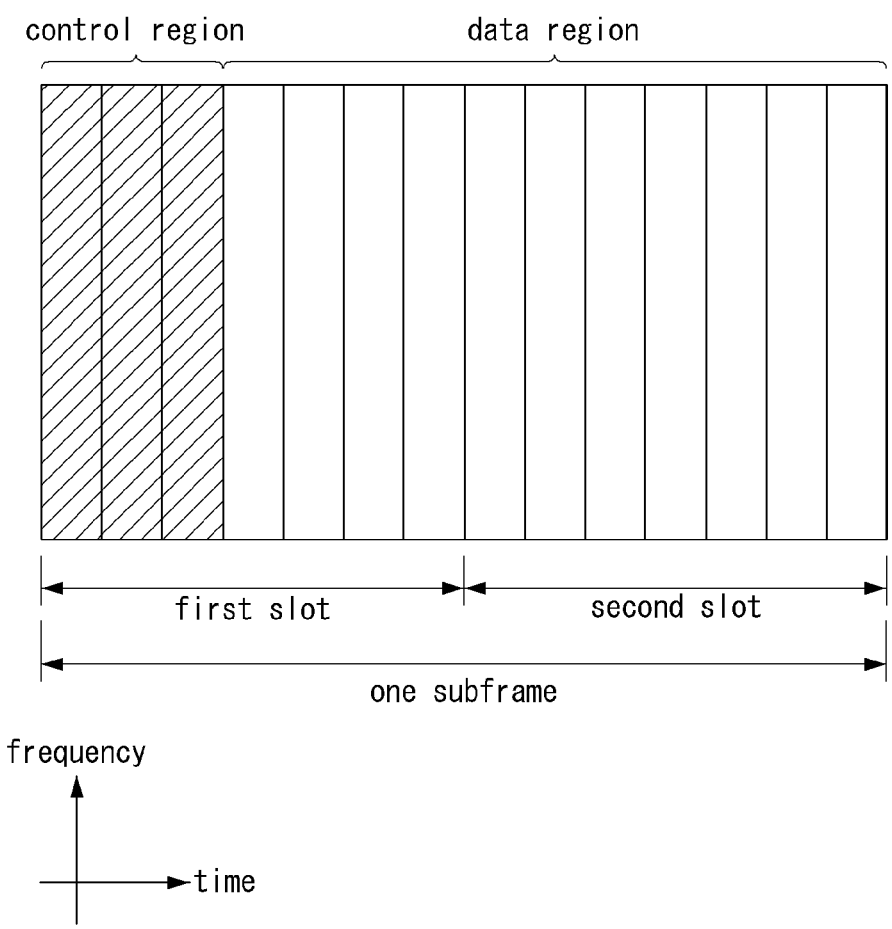

[FIG. 4]
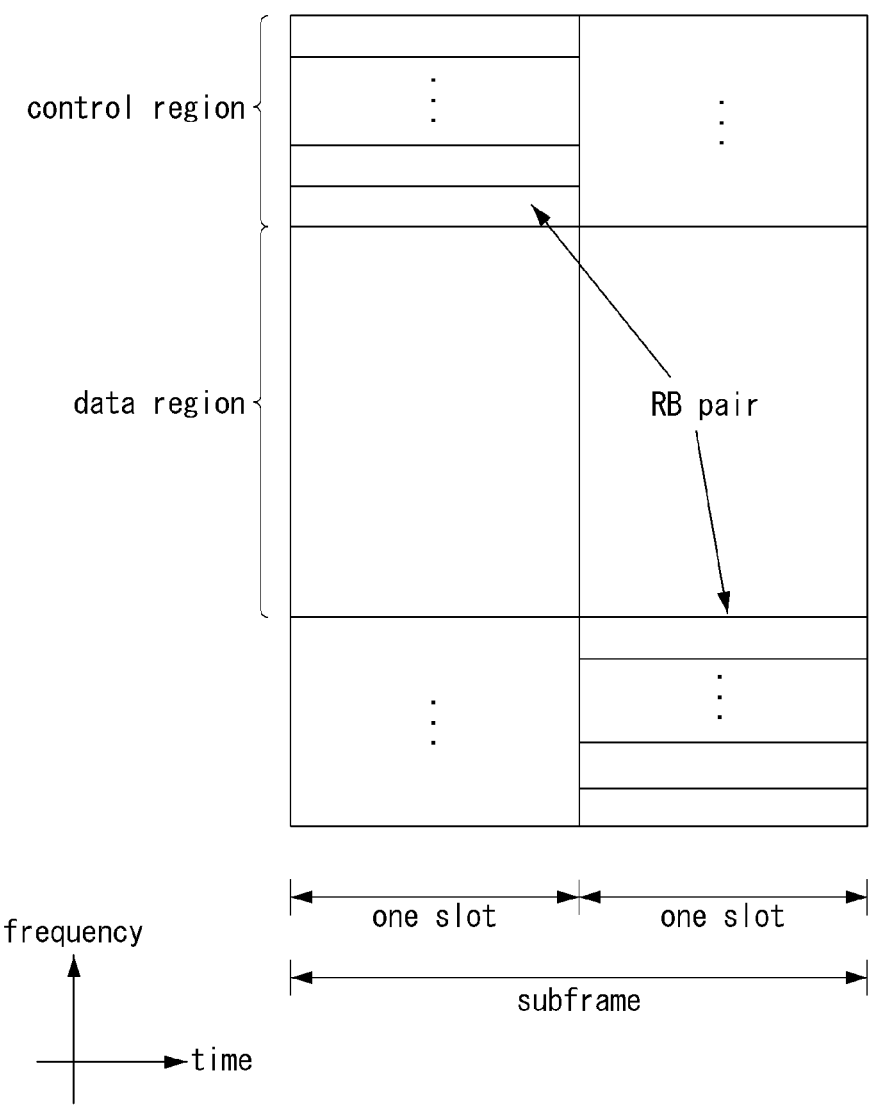

【FIG. 5】
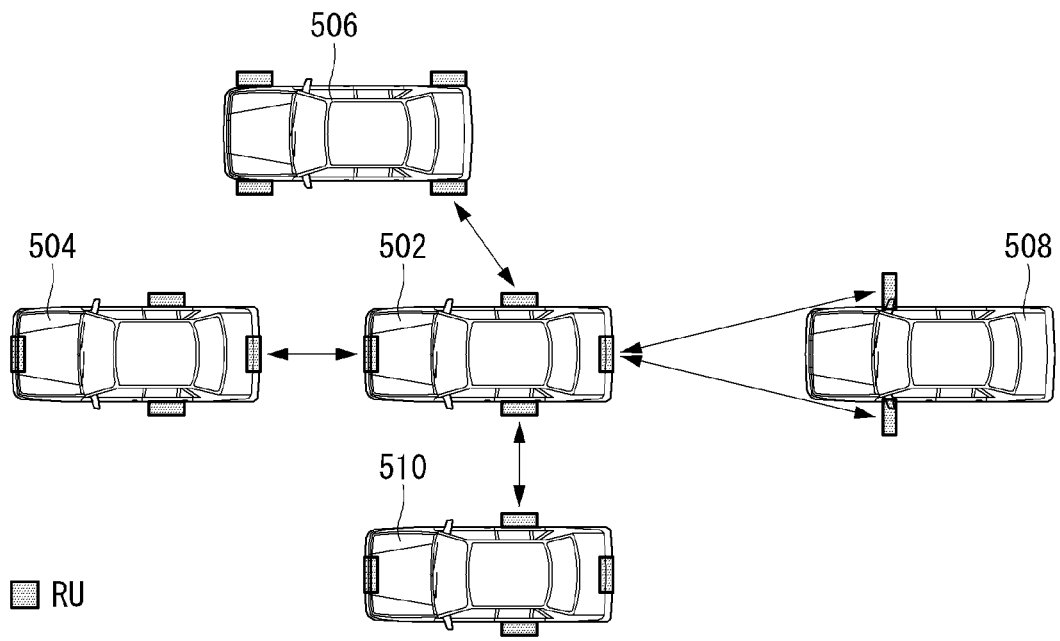
【FIG. 6】
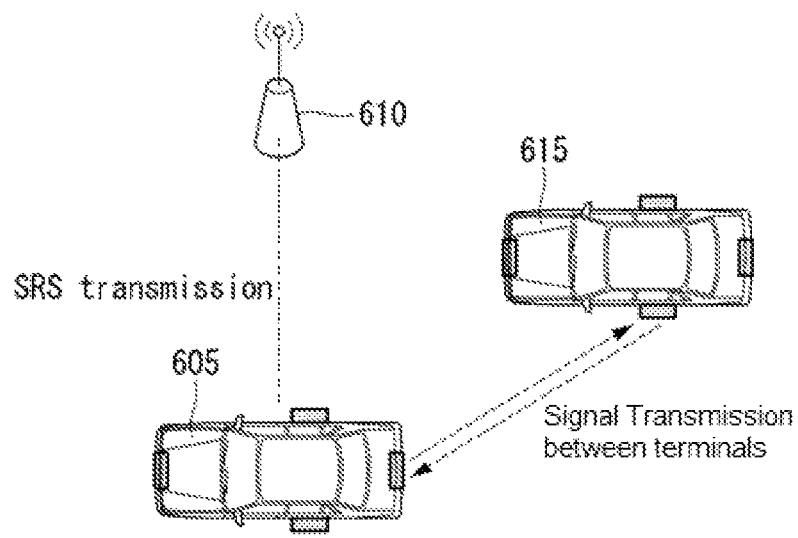

【FIG. 7】
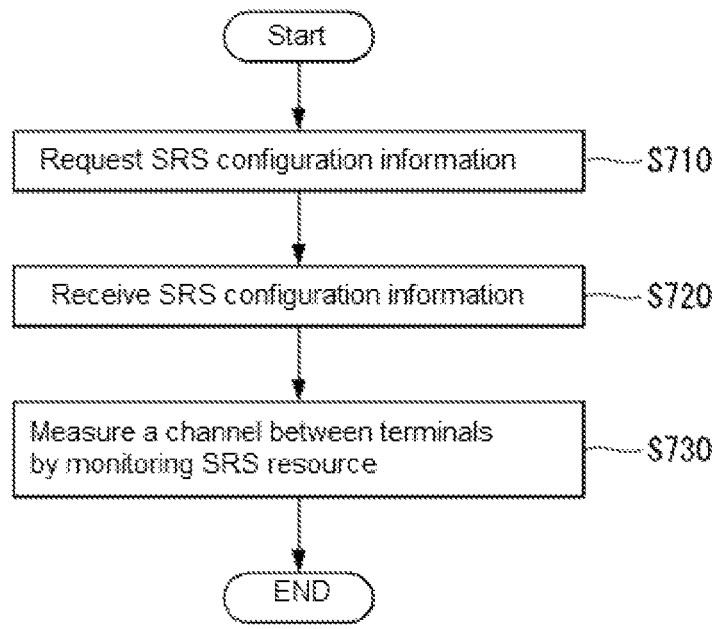
【FIG. 8】
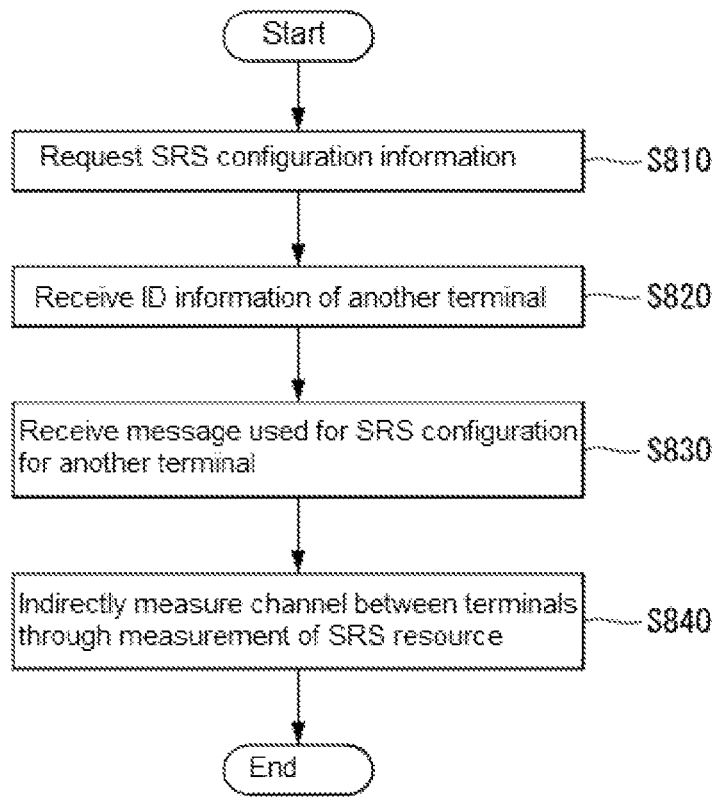

[FIG. 9]
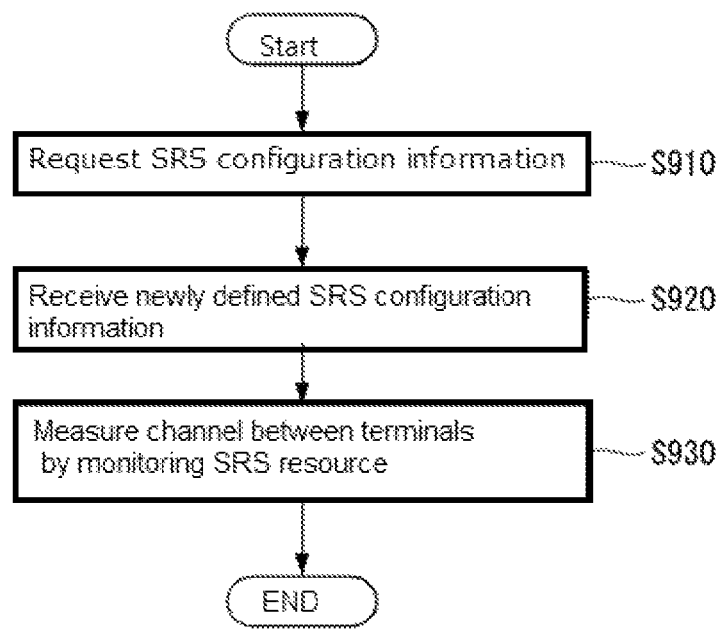

【FIG. 10】
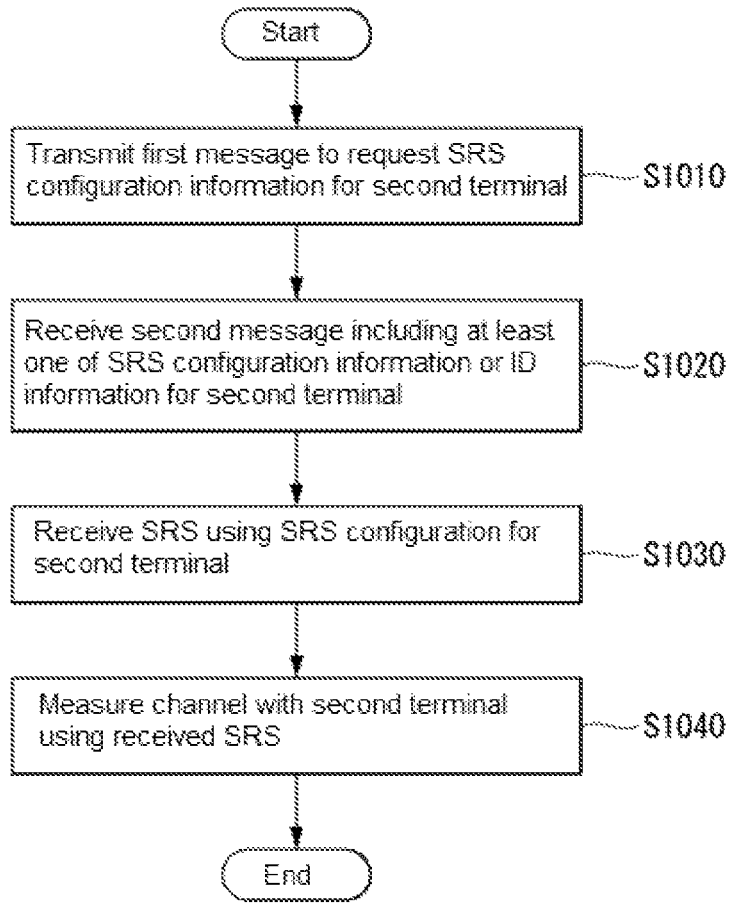
【FIG. 11】
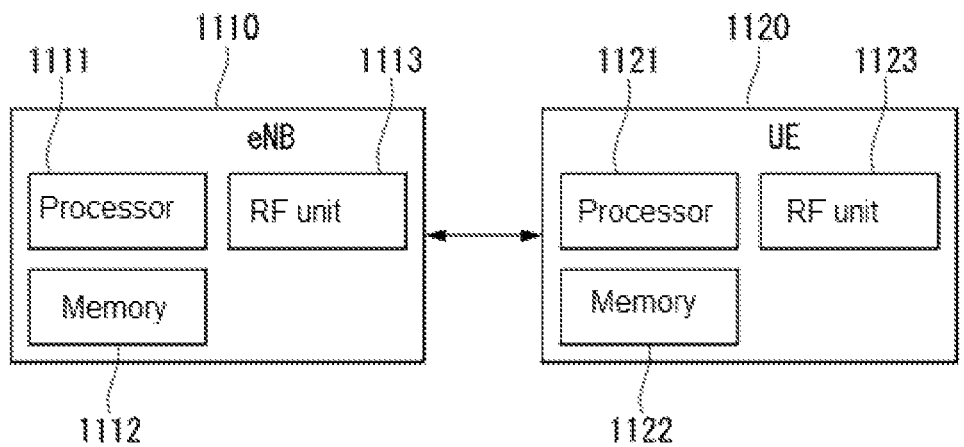

METHOD FOR MEASURING CHANNEL BETWEEN TERMINALS IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/001628, filed on Feb. 15, 2017, the contents of which are all hereby incorporated by reference herein in their entireties.

TECHNICAL FIELD

The present invention relates to a wireless communication system and, more particularly, to a method for measuring a channel between terminals and an apparatus supporting the same

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

If reference signal (RS) resources for channel measurement are separately allocated to two terminals in order to measure a channel between the terminals, there is a problem in that additional RS overhead occurs.

In order to solve the problem, the present invention proposes a method for measuring a channel between terminals based on sounding reference signal (SRS) measurement between a base station and a specific terminal in a wireless communication system.

Furthermore, the present invention proposes a method for measuring a channel between terminals using an SRS transmitted by a specific terminal if a periodic SRS has been configured in the specific terminal.

Furthermore, the present invention proposes a method for measuring a channel between terminals using an SRS, which is newly configured by a base station and transmitted by a specific terminal, if a periodic SRS has not been configured in the specific terminal.

Furthermore, the present invention proposes a method for receiving SRS configuration information for a specific terminal from a base station, receiving an SRS based on the SRS configuration information, and measuring a channel between terminals using the SRS.

Furthermore, the present invention proposes a method for receiving ID information of a specific terminal from a base station, identifying SRS configuration information for the specific terminal based on the ID information, receiving an SRS, and measuring a channel between terminals using the SRS.

Furthermore, the present invention proposes a method for measuring a channel between terminals an SRS transmitted in a frequency resource related to a resource now used for sidelink communication between the terminals.

Technical objects to be achieved by the present invention are not limited to the aforementioned technical objects, and other technical objects not described above may be evidently understood by a person having ordinary skill in the art to which the present invention pertains from the following description.

Technical Solution

A method of measuring a channel in a wireless communication system according to an embodiment of the present invention is performed by a first user equipment, and includes transmitting, to a base station, a first message to request sounding reference signal (SRS) configuration information for a second user equipment, receiving, from the base station, a second message including at least one of the SRS configuration information for the second user equipment or identification information for the second user equipment, receiving, from the second user equipment, at least one SRS using an SRS configuration for the second user equipment identified based on the received second message, and measuring a channel with the second user equipment using the received at least one SRS.

Furthermore, in the present invention, the method further includes receiving, from the base station, a third message using the identification information for the second user equipment, wherein the third message is a message through which the base station configures, in the second user equipment, a resource in which the at least one SRS is to be transmitted, and identifying the SRS configuration information for the second user equipment using the third message.

Furthermore, in the present invention, measuring a channel with the second user equipment includes measuring the channel with the second user equipment using an SRS transmitted in a specific frequency resource among at least one resource in which the at least one SRS is transmitted. The specific frequency resource is determined based on a frequency resource currently used in a link between the first user equipment and the second user equipment.

Furthermore, in the present invention, if a periodic SRS has not been configured in the second user equipment, the SRS configuration is configured by the base station in response to the request. The SRS configuration includes at least one of a periodic SRS configuration or an aperiodic SRS configuration.

Furthermore, in the present invention, if each of the first user equipment and the second user equipment includes a plurality of distributed antennas, the SRS configuration is configured for each antenna.

Furthermore, in the present invention, the SRS configuration configured for each antenna includes at least one of transmission periodicity of an SRS or a subframe offset configured for each antenna.

Furthermore, in the present invention, the method further includes selecting a specific antenna to be used to transmit a signal to the second user equipment, among a plurality of antennas of the first user equipment, based on information for the measured channel with the second user equipment.

Furthermore, in the present invention, the SRS configuration information for the second user equipment included in the second message includes configuration information of an SRS corresponding to a specific antenna selected by the base station, among a plurality of antennas of the second user equipment. The specific antenna is determined based on a measurement value of an uplink channel of the second user equipment, which is previously measured by the base station.

Furthermore, in the present invention, the first message includes SRS configuration information for a specific antenna, among a plurality of antennas of the first user equipment, and identification information for the specific antenna.

Furthermore, in the present invention, the SRS configuration information for the second user equipment includes non-precoded SRS configuration information.

Furthermore, in the present invention, the identification information for the second user equipment includes a cell-radio network temporary identifier (C-RNTI) of the second user equipment.

Furthermore, in the present invention, the at least one SRS includes a non-overlapped SRS with at least one of an uplink signal transmitted to the base station or a downlink signal received from the base station.

Furthermore, in the present invention, the channel with the second user equipment is configured based on at least one of unicast service or multicast service between the first user equipment and the second user equipment.

A first user equipment measuring a channel in a wireless communication system according to another embodiment of the present invention includes a transmitting/receiving unit for transmitting or receiving radio signals, and a processor functionally connected to the transmitting/receiving unit. The processor is configured to transmit, to a base station, a first message to request sounding reference signal (SRS) configuration information for a second user equipment, receive, from the base station, a second message including at least one of the SRS configuration information for the second user equipment or identification information for the second user equipment, receive, from the second user equipment, at least one SRS using an SRS configuration for the second user equipment identified based on the received second message, and measure a channel with the second user equipment using the received at least one SRS.

Advantageous Effects

According to an embodiment of the present invention, a terminal can perform channel measurement using an SRS transmitted by a specific terminal without a separate reference signal (RS) for channel measurement between terminals in an environment in which a plurality of terminals is present.

Furthermore, in the present invention, unnecessary RS overhead may not occur because channel measurement between terminals is performed without a separate RS.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings included as part of the detailed description in order to help understanding of the present invention provide embodiments of the present invention, and describe the technical characteristics of the present invention along with the detailed description.

FIG. 1 illustrates the structure of a radio frame in a wireless communication system to which the present invention may be applied.

FIG. 2 is a diagram illustrating a resource grid for one downlink slot in a wireless communication system to which the present invention may be applied.

FIG. 3 illustrates the structure of a downlink subframe in a wireless communication system to which the present invention may be applied.

FIG. 4 illustrates the structure of an uplink subframe in a wireless communication system to which the present invention may be applied.

FIG. 5 shows an example of a V2V link configuration between vehicles according to an embodiment of the present invention.

FIG. 6 shows an example of a system that measures an inter-terminal channel based on an SRS according to various embodiments of the present invention.

FIG. 7 shows an example of an operational flowchart of a terminal that measures an inter-terminal channel if a periodic SRS has been configured according to various embodiments of the present invention.

FIG. 8 shows an example of an operational flowchart of a terminal that measures an inter-terminal channel if a periodic SRS has not been configured according to various embodiments of the present invention.

FIG. 9 shows another example of an operational flowchart of a terminal that measures an inter-terminal channel if a periodic SRS has not been configured according to various embodiments of the present invention.

FIG. 10 shows an operational flowchart of a terminal that measures an inter-terminal channel using an SRS according to various embodiments of the present invention.

FIG. 11 illustrates a block diagram of a wireless communication device according to an embodiment of the present invention.

MODE FOR INVENTION

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure.

The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes.

Table 1 shows the uplink-downlink configuration.

TABLE 1

| Uplink-Downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PH ICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with sidelink shared channel (SL-SCH) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPOCH by merging different numbers of ECCEs. The EPOCH may use localized transmission or distributed transmission, which may result in different mapping of the ECCE to the REs in the PRB.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to a PUCCH for one terminal. RBs included in the RB pair occupy different subcarriers in two slots, respectively. The RB pair allocated to the PUCCH frequency-hops in a slot boundary.

Sounding Reference Signal (SRS)

An SRS is transmitted on the uplink so that a base station can estimate uplink channel states in different frequencies. For example, channel-state estimates are used for a network scheduler to allocate a resource block having instantaneously excellent quality for uplink physical uplink shared channel (PUSCH) transmission (uplink channel-dependent scheduling) and to select a different transmission parameter, such as an instantaneous data rate, and a different parameter related to uplink multi-antenna transmission. As described above, SRS transmission may also be used to estimate a downlink channel condition assuming uplink timing estimation and downlink/uplink channel reciprocity. Accordingly, an SRS does not need to be essentially transmitted along with a given physical channel. For example, if an SRS is transmitted along with a PUSCH, the SRS may cover a different, typically larger frequency span. SRS transmission defined for the LTE uplink includes two types, such as periodic SRS transmission available for the first Release (Release 8) of LTE and aperiodic SRS transmission (introduced in LTE Release 10).

In the case of periodic SRS transmission, SRS transmission by a terminal occurs at given time intervals every 2 ms (or every subframe per second) to every 160 ms (or every 16-th frame) as infrequently. If an SRS is transmitted in a subframe, the SRS occupies the last symbol of the subframe.

In the case of aperiodic SRS transmission, unlike in a periodic SRS, the aperiodic SRS is transmitted one time, and is triggered by signaling for a physical downlink control channel (PDCCH) as part of a scheduling grant. The frequency domain structure of aperiodic SRS transmission is the same as the frequency domain structure of a periodic SRS. Furthermore, an aperiodic SRS is transmitted within the last symbol of a subframe using the same method as periodic SRS transmission. Furthermore, a time instance at which an aperiodic SRS may be transmitted is configured in each terminal using higher layer signaling. A frequency domain parameter for an aperiodic SRS (bandwidth, odd or even comb) is configured by higher layer (RRC) signaling. However, SRS transmission will not be actually performed until a terminal is explicitly triggered by an explicit SRS trigger on a PDCCH. If such a trigger is received, a single SRS is transmitted in a next available aperiodic SRS instance configured in a terminal using frequency domain parameters. When an additional trigger is received, additional SRS transmission may be performed.

In the system information block (SIB) 2, an SRS may be configured with information elements shown in Table 3.

```
| +-physicalConfigDedicated ::= SEQUENCE [0000110110] OPTIONAL:Exist
|    +-pdsch-ConfigDedicated ::= SEQUENCE OPTIONAL:Omit
|    +-pucch-ConfigDedicated ::= SEQUENCE OPTIONAL:Omit
|    +-pusch-ConfigDedicated ::= SEQUENCE OPTIONAL:Omit
|    +-uplinkPowerControlDedicated ::= SEQUENCE OPTIONAL:Omit
|    +-tpc-PDCCH-ConfigPUCCH ::= CHOICE [setup] OPTIONAL:Exist
|    +-tpc-PDCCH-ConfigPUSCH ::= CHOICE [setup] OPTIONAL:Exist
|    +-cqi-ReportConfig ::= SEQUENCE OPTIONAL:Omit
|    +-soundingRS-UL-ConfigDedicated ::= CHOICE [setup] OPTIONAL:Exist
|    |    +-setup ::= SEQUENCE
|    |      +-srs-Bandwidth ::= ENUMERATED [bw0]
|    |      +-srs-HoppingBandwidth ::= ENUMERATED [hbw0]
|    |      +-freqDomainPosition ::= INTEGER (0..23) [0]
|    |      +-duration ::= BOOLEAN [FALSE]
|    |      +-srs-ConfigIndex ::= INTEGER (0..1023) [0]
|    |      +-transmissionComb ::= INTEGER (0..1) [0]
|    |      +-cyclicShift ::= ENUMERATED [cs0]
|    +-antennaInfo ::= CHOICE [explicitValue] OPTIONAL:Exist
|    +-schedulingRequestConfig ::= CHOICE OPTIONAL:Omit
```

In this case, "srs-BandwidthConfig" may mean the transmission bandwidth configuration of the SRS. "srs-SubframeConfig" may mean the transmission of an SRS subframe configuration. "ackNackSRS-SimultaneousTransmission" may mean whether the SRS and ACK/NACK are simultaneously transmitted. "srs-MaxUpPts" may mean a maximum uplink pilot time slot in which the SRS is transmitted in time division duplex (TDD). "uplinkPowerContorlCommon" may mean uplink power control.

Furthermore, in RRC connection setup and an RRC connection reconfiguration, an SRS may be configured with information elements shown in Table 4.

TABLE 4

```
| +-radioResourceConfigCommon ::= SEQUENCE
| | +-rach-ConfigCommon ::= SEQUENCE
| | +-bcch-Config ::= SEQUENCE
| | +-pcch-Config ::= SEQUENCE
| | +-prach-Config ::= SEQUENCE
| | +-pdsch-ConfigCommon ::= SEQUENCE
| | +-pusch-ConfigCommon ::= SEQUENCE
| | +-pucch-ConfigCommon ::= SEQUENCE
| | +-soundingRS-UL-ConfigCommon ::= CHOICE[setup]
| | | +-setup ::= SEQUENCE [0]
| | |    +-srs-BandwidthConfig ::= ENUMERATED[bw2]
| | |    +-srs-SubframeConfig ::= ENUMERATED[sc0]
| | |    +-ackNackSRS-SimultaneousTransmission ::=BOOLEAN [TRUE]
| | |    +-srs-MaxUpPts ::= ENUMERATEDOPTIONAL:Omit
| | +-uplinkPowerControlCommon ::= SEQUENCE
| | +-ul-CyclicPrefixLength ::= ENUMERATED[len1]
```

In this case, "srs-Bandwidth" may mean the transmission bandwidth of the SRS. "srs-HoppingBandwidth" may mean the hopping bandwidth of the SRS, that is, a frequency domain in which SRS transmission hops on a frequency. "freqDomainPosition" may mean the position on the frequency domain, that is, the position where SRS transmission starts on the frequency domain. "duration" may mean periodicity in a time domain for SRS transmission. "srs-ConfigIndex" may mean the index of an SRS configuration. "transmissionComb" may mean a transmission comb. "cyclicshift" may mean phase rotation applied to the SRS.

With the development of LTE(-A) or a new ratio access technology (New RAT(NR)), services using communication between vehicles are being developed.

For example, a vehicle to which a technology for performing communication between vehicles has been applied may provide services, such as platooning, convoy, and cooperative maneuver assistance.

For example, a vehicle needs to collect information of surrounding vehicles in order to perform platooning. In this case, the information of surrounding vehicles may include speed and absolute and/or relative position information of the vehicles on the front, rear and/or side of a corresponding vehicle. As the corresponding vehicle collects the information of surrounding vehicles, the vehicle may control the speed and direction of the vehicle for platooning using the collected information.

As described above, in order for a vehicle to collect information necessary to provide services, the vehicle needs to be communicationally connected to surrounding vehicles through.

In other words, in order to provide the services, the vehicle needs to form a plurality of vehicle-to-vehicle (V2V) links (or connections) with the surrounding vehicles.

In this case, the V2V link may mean a connection, communication connection, communication link or a radio link between the vehicle or communication devices mounted on the vehicle, a sidelink connection between terminals (or vehicles).

The V2V communication technology of legacy LTE was developed for an object of broadcasting, by a vehicle, its own information to the surroundings. In other words, in the V2V communication technology of legacy LTE, a V2V link configuration in which a vehicle unicasts its own information has not been taken into consideration.

In this case, in the case of the broadcast method, the ratio unit of the vehicle needs to support an omni-antenna characteristic because the vehicle must transmit a signal omni-directionally.

However, if the vehicle transmits a signal using the unicast method, a direct V2V link is formed between vehicles. Accordingly, In this case, a plurality of radio units having characteristics of directional antennas may be mounted on the vehicle in order to form direct V2V links between vehicles. Furthermore, if communication through a high frequency band of 6 GHz or more is taken into consideration as in the 5G radio communication system (NR), in order to improve communication performance through a beam gain, a plurality of radio units having characteristics of the directional antennas may be inevitably mounted.

If a plurality of radio units is mounted on a vehicle, the vehicle can support a plurality of V2V links more efficiently in the viewpoint of communication delay and/or the capacity.

In the following description, a terminal may be used as a term which generally refers to a vehicle, a communication device installed in a vehicle, a movable communication device, or a communication device installed in a specific area.

FIG. 5 shows an example of a V2V link configuration between vehicles according to an embodiment of the present invention. FIG. 5 is merely for convenience of description, and does not limit the scope of the present invention.

Referring to FIG. 5, each of terminals 502, 504, 506, 508, and 510 may include a plurality of radio units. The positions where radio units shown in FIG. 5 are installed are for convenience of description. The radio units may be installed in various parts (e.g., front/rear bumper, side mirror, wheel, door) of the terminal.

In the case of FIG. 5, a radio unit mounted on at the front of the terminal 502 may be connected to a radio unit mounted at the rear of the terminal 504. Accordingly, a V2V link between the terminal 502 and the terminal 504 may be configured (or formed).

Furthermore, a radio unit mounted at the rear of the terminal 502 may be connected to radio units mounted on the side mirrors of the terminal 508. Accordingly, a V2V link between the terminal 502 and the terminal 508 may be configured.

Furthermore, the terminal 502 may configure V2V links with the terminal 510 or the terminal 506 using radio units mounted on the left or right of the terminal 502, respectively.

In order to configure a V2V link, such as that described above, and/or after the V2V link is configured, an inter-terminal channel needs to be measured (or estimated).

In this case, in order to measure the inter-terminal channel, in general, a resource of a reference signal (RS) for channel measurement is separately allocated to each of the terminals.

However, if a separate resource of a RS is allocated in order to measure an inter-terminal channel, a problem in that RS overhead according to an additional RS occurs may be caused.

In this specification, an inter-terminal channel may mean a communication channel (e.g., V2V communication channel) between terminals.

For example, in the case of FIG. 5, each RS resource must be separately allocated for the channel measurement of each connection (V2V link or sidelink) between the terminals 502, 504, 506, 508, and 510.

Accordingly, the present invention proposes a method of measuring a channel between terminals while not allocating a separate resource of a RS if a plurality of terminals is present.

More specifically, the present invention proposes an inter-terminal channel measurement scheme based on the measurement of a sounding reference signal (SRS) between a base station and a specific terminal.

FIG. 6 shows an example of a system that measures an inter-terminal channel based on an SRS according to various embodiments of the present invention. FIG. 6 is merely for convenience of description, and does not limit the scope of the present invention.

Referring to FIG. 6, it is assumed that a terminal 605 performs uplink transmission to a base station 610. In other words, it is assumed that the terminal 605 transmits an uplink SRS to the base station 610.

In this case, the SRS may be configured as a periodic or aperiodic SRS.

In this case, a situation in which the terminal 605 wants to transmit a control signal or data signal to a terminal 615 through communication (e.g., V2V link) between terminals, while the terminal 605 transmits an SRS to the base station 610, may be taken into consideration.

Furthermore, a situation in which the terminal 615 wants to transmit a control signal or data signal the terminal 605 through inter-terminal communication, while the terminal 605 transmits an SRS to the base station 610, may be taken into consideration.

In the following specification, there is described a method proposed assuming the situation in which the terminal 615 wants to transmit a control signal or data signal to the terminal 605 through inter-terminal communication when the terminal 605 performs uplink transmission on the base station 610, for convenience of description.

In other words, in the viewpoint of inter-terminal communication, the terminal 605 may be a reception terminal and the terminal 615 may be a transmission terminal.

The assumption does not limit the proposed method, and may also be applied to a method in which the terminal 605 is a transmission terminal and the terminal 615 is a reception terminal.

Furthermore, in various embodiments of the present invention, the terminal 615 that receives an SRS transmitted by the terminal 605 needs to receive the SRS by taking into consideration a resource that may be transmitted to and received from the terminal 605 and a resource (uplink transmission resource, downlink reception resource) that may be transmitted to and received from the base station 610.

In this case, the resource that may be transmitted and received between terminals may mean a resource defined for a link (or a sidelink) between the terminals. In this case, the sidelink is a concept including sidelink discovery, sidelink communication, and vehicle to everything (V2X) sidelink communication.

Furthermore, uplink transmission means that a terminal transmits a signal to a base station. Downlink reception means that a terminal receives a signal from a base station.

For example, the terminal 615 may receive an SRS transmitted by the terminal 605 by controlling transmission/reception timing so that the SRS does not overlap an uplink signal transmitted to the base station or a downlink signal received from the base station. More specifically, the terminal 615 may receive an SRS transmitted by the terminal 605 through a resource to which uplink transmission to the base station or downlink reception from the base station has not been allocated, by taking into consideration an SRS configuration.

For another example, the terminal 605 that transmits an SRS may transmit the SRS by taking into consideration the uplink transmission or downlink reception of the terminal 615, so that the SRS does not overlap the uplink transmission or downlink reception of the terminal 615. In this case, the terminal 605 may transmit the SRS through a non-overlapped resource based on uplink/downlink resource allocation information related to the terminal 615 and received from the base station.

For yet another example, if the uplink transmission or downlink reception of the terminal 615 and an SRS received from the terminal 605 overlap, the terminal 615 may receive any one of the uplink transmission (or downlink reception) or the SRS according to priority. In other words, any one of the uplink transmission (or downlink reception) or the SRS may be dropped according to the priority.

As described above, in the present invention, a specific terminal can indirectly measure a channel between the specific terminal and a different terminal (e.g., a communication channel between terminals) using an SRS transmitted from the different terminal to a base station for uplink data transmission.

In this case, indirect measurement may mean that an inter-terminal channel is measured using an SRS, transmitted from a different terminal to a base station, for communication between the terminal and base station, not a separate resource of a RS allocated to measure a channel between terminals.

In this case, the SRS used for the channel measurement between terminals may have been configured periodically or may not have been configured periodically.

Accordingly, a method of measuring a channel between terminals, proposed in the present invention, may be divided into a method of measuring a channel between terminals using a periodically configured SRS and a method of measuring a channel between terminals by configuring an SRS if an SRS has not been periodically configured.

Measurement of a Channel Between Terminals if a Periodic SRS has been Configured FIG. 7 shows an example of an operational flowchart of a terminal that measures an inter-terminal channel if a periodic SRS has been configured according to various embodiments of the present invention. FIG. 7 is merely for convenience of description, and does not limit the scope of the present invention.

Referring to FIG. 7, a system in which the terminal 605, the terminal 615, and the base station 610 are present as in FIG. 6 is assumed. Furthermore, an operation described with reference to FIG. 7 may be performed by the terminal 615 that measures an inter-terminal channel by receiving an SRS transmitted from the terminal 605 to the base station 610.

At step S710, the terminal 615 may request the base station 610 for SRS configuration information for the terminal 605. In this case, the terminal 615 may transmit a message to the base station 610 in order to request configuration information for a periodically configured uplink SRS (or periodic SRS).

After the terminal 615 requests the base station 610 for the SRS configuration information, at step S720, the terminal 615 may receive the SRS configuration information from the base station 610.

In this case, the base station 610 may transmit, to the terminal 615, pre-configured SRS configuration information for the terminal 605 so that an SRS transmitted by the terminal 605 can be received by the terminal 615.

The SRS configuration information may include information on periodicity in the time domain for the transmission of the SRS, the transmission bandwidth of the SRS, the transmission subframe offset of the SRS, the hopping bandwidth of the SRS, the position of the SRS on the frequency domain, whether the SRS and ACK/NACK are simultaneously transmitted, and a maximum uplink pilot time slot of the SRS.

In this case, the base station 610 may transmit the SRS configuration information to the terminal 615 through higher layer signaling (e.g., radio resource control (RRC) signaling) and/or downlink control information (DCI).

After the terminal 615 receives the SRS configuration information from the base station 610, at step S730, the terminal 615 may measure an inter-terminal channel by monitoring an SRS resource transmitted by the terminal 605. In this case, the measurement may mean indirect measurement.

In this case, the terminal 615 may monitor the SRS, periodically transmitted by the terminal 605, using the received SRS configuration information.

Furthermore, in a situation of communication between terminals through a sidelink, reciprocity between an uplink channel and a downlink channel may be established.

Accordingly, the terminal 615 may obtain channel information on a channel in which a signal (control signal or data signal) is to be transmitted to the terminal 605, from channel measurement using an SRS transmitted by the terminal 605 based on the reciprocity.

Unlike in the assumption of FIG. 7, if the terminal 605 tries to transmit a signal to the terminal 615 while it transmits an SRS to the base station 610, the terminal 605 may not use channel reciprocity. In this case, the terminal 605 may obtain channel information for a channel in which a signal is to be transmitted to the terminal 615 using the same method as a method of measuring an uplink channel.

In various embodiments of the present invention, although a periodic SRS has been configured for the terminal 605, it may be difficult for the terminal 615 to predict the direction of a beam for the terminal 605 by receiving (or overhearing) an SRS transmitted by the terminal 605.

For example, if the base station 610 has configured a precoded SRS for the terminal 605, accurate measurement of channel between terminals may be impossible.

In this case, the terminal 605 may transmit, to the base station 610, an SRS port beamformed in the direction toward the base station 610.

Alternatively, the terminal 605 may transmit, to the base station 610, an SRS port beamformed in a direction not related to (having no relation with) the direction for the terminal 615.

In this case, the beamformed SRS port may mean an SRS configured to be transmitted in a specific direction.

If a beamformed SRS port(s) is transmitted as described above, although the terminal 615 receives an SRS transmitted by the terminal 605, it may be difficult for the terminal 615 to calculate a precoder (or precoding) suitable for being used in a case where a signal is transmitted to the terminal 605.

Accordingly, if a periodic SRS is configured as a precoded SRS, the following inter-terminal channel measurement method if a periodic SRS has not been configured may be used for accurate channel measurement between terminals.

In view of the above contents, if the base station 610 receives a request for SRS configuration information (for inter-terminal communication or sidelink communication) from the terminal 615, the base station 610 may transmit only non-precoded SRS configuration information to the terminal 605.

In this case, the terminal 615 can measure a channel between terminals more precisely (or obtain more precise inter-terminal channel information) by monitoring the non-precoded SRS.

Furthermore, in various embodiments of the present invention, as shown in FIGS. 5 and 6, a case where each terminal (or vehicle) has a plurality of distributed antennas (or radio units (RUs)) (or mounted) may be taken into consideration.

For example, the terminal 605 may measure an uplink channel for each distributed antenna using another (or different) SRS configuration for each distributed antenna (or antenna group, beam group).

Furthermore, at the same time, the terminal 615 may indirectly measure a channel in which a signal will be transmitted to the terminal 605, by receiving (or overhearing) an SRS transmitted for each distributed antenna. In this case, the terminal 615 may select a distributed antenna (or antenna group, beam group) of the terminal 615 suitable for inter-terminal communication with the terminal 605, based on information on the measured channel.

If a terminal has a plurality of distributed antennas as in the example, the periodicity and/or offset (e.g., subframe offset) of an SRS may be differently configured for each distributed antenna. In other words, transmission timing of an SRS may be differently configured (or classified) for each distributed antenna.

For another example, the base station 610 may select a distributed antenna of the terminal 605 to be used for inter-terminal communication based on an experience value (e.g., long-term measurement) for the uplink channel of the terminal 605 that has been measured so far.

Accordingly, if the terminal 615 requests the base station 610 for SRS configuration information for the terminal 605, the base station 610 may transmit, to the terminal 615, only the SRS configuration information for a selected distributed antenna.

In this case, the terminal 615 may obtain channel information for an inter-terminal communication channel with the terminal 605 by monitoring an SRS transmitted by the selected distributed antenna.

For yet another example, the terminal 615 may select at least one distributed antenna to be used to indirectly measure an inter-terminal channel among a plurality of distributed antennas of the terminal 605.

In this case, the terminal 615 may transmit (or signal), to the base station 610, information on the selected at least one distributed antenna (e.g., the index of the distributed antenna).

Accordingly, the base station 610 may transmit SRS configuration information for the selected at least one distributed antenna in accordance with received information.

Thereafter, the terminal 615 may indirectly measure an inter-terminal channel by monitoring an SRS transmitted in the selected at least one distributed antenna. Accordingly, there is an effect in that monitoring overhead for an unnecessary SRS can be reduced.

The above-described contents correspond to a case where a periodic SRS has been configured in a specific terminal.

However, to configure a periodic SRS in a terminal is not essential. Accordingly, a method of measuring an inter-terminal channel using an SRS, proposed in the present invention, although a periodic SRS is not configured in a terminal needs to be taken into consideration.

Detailed contents for channel measurement between terminals if a periodic SRS has not been configured are described below.

Measurement of a Channel Between Terminals if a Periodic SRS has not been Configured FIG. 8 shows an example of an operational flowchart of a terminal that measures an inter-terminal channel if a periodic SRS has not been configured according to various embodiments of the present invention. FIG. 8 is merely for convenience of description, and does not limit the scope of the present invention.

Referring to FIG. 8, a system in which the terminal 605, the terminal 615, and the base station 610 are present as in FIG. 6 is assumed. Furthermore, an operation described with reference to FIG. 8 may be performed by the terminal 615 that measures an inter-terminal channel by receiving an SRS transmitted from the terminal 605 to the base station 610.

At step S810, the terminal 615 may request SRS configuration information for the terminal 605 from the base station 610. The request may be a request for configuration information for a periodic SRS and/or an aperiodic SRS.

If a periodic SRS for the terminal 605 has not been configured, the base station 610 may configure a periodic or aperiodic SRS for the terminal 605 based on the request. In this case, if the periodic SRS and the aperiodic SRS are configured at the same time, only one of them may be configured to be transmitted. For example, if a periodic SRS and an aperiodic SRS have been configured in the terminal 605 at the same time, the terminal 605 may transmit only the aperiodic SRS.

The base station 610 may measure an uplink channel from the terminal 605 based on the SRS configuration.

After the terminal 615 requests the SRS configuration information, at step S820, the terminal 615 may receive ID information (e.g., cell-radio network temporary identifier (C-RNTI) of the terminal 605 from the base station 610.

In this case, the ID information of the terminal 605 may be used for the terminal 615 to receive an SRS configuration message for the terminal 605. In other words, the terminal 615 may overhear an SRS configuration for the terminal 605 based on the ID information of the terminal 605.

After the terminal 615 receives the ID information of the terminal 605, at step S830, the terminal 615 may receive a message used for the SRS configuration for the terminal 605.

In this case, the terminal 615 may overhear the SRS configuration message between the terminal 605 and the base station 610 using the received ID information of the terminal 605. For example, the terminal 615 may receive (or decode) an RRC message, transmitted from the base station 610 to the terminal 605 for the SRS configuration, based on the ID information of the terminal 605.

Accordingly, the terminal 615 may obtain (or identify) information, configured by the base station 610 for the terminal 605, for a periodicity in a time domain for the transmission of an SRS, a transmission bandwidth, a transmission subframe offset, a hopping bandwidth, a position in a frequency domain, whether the SRS and ACK/NACK are simultaneously transmitted, and a maximum uplink pilot time slot.

After the terminal 615 obtains the information related to the SRS configuration for the terminal 605, at step S840, the terminal 615 may measure an inter-terminal channel through the monitoring of an SRS resource transmitted by the terminal 605. In this case, the measurement may mean indirect measurement.

In this case, the terminal 615 may monitor an SRS, periodically or aperiodically transmitted by the terminal 605, using the obtained information related to the SRS configuration.

Furthermore, in an inter-terminal communication situation through a sidelink, reciprocity between an uplink channel and a downlink channel may be established.

Accordingly, the terminal 615 may obtain channel information for a channel in which a signal will be transmitted to the terminal 605, from channel measurement using an SRS transmitted by the terminal 605, based on the reciprocity. As a result, the terminal 615 may determine a beam direction to be used for inter-terminal communication with the terminal 605.

Unlike in the assumption of FIG. 8, if the terminal 605 tries to transmit a signal to the terminal 615, while transmitting an SRS to the base station 610, the terminal 605 may not use channel reciprocity. In this case, the terminal 605 may obtain channel information for a channel in which a signal is to be transmitted to the terminal 615 using the same method as a method of measuring an uplink channel.

Furthermore, in various embodiments of the present invention, if the terminal 615 requests SRS configuration information for the terminal 605 from the base station for sidelink communication, the base station 610 may transmit only non-precoded SRS configuration information in the same manner as the method described in the part of FIG. 7.

FIG. 9 shows another example of an operational flowchart of a terminal that measures an inter-terminal channel if a periodic SRS has not been configured according to various embodiments of the present invention. FIG. 9 is merely for convenience of description, and does not limit the scope of the present invention.

Referring to FIG. 9, a system in which the terminal 605, the terminal 615, and the base station 610 are present as in FIG. 6 is assumed. Furthermore, an operation described with reference to FIG. 9 may be performed by the terminal 615 that measures an inter-terminal channel by receiving an SRS transmitted from the terminal 605 to the base station 610.

At step S910, the terminal 615 may request SRS configuration information for the terminal 605 from the base station 610. The request may be configuration information for a periodic SRS and/or an aperiodic SRS.

In this case, the operation of the terminal and the base station at step S910 may be similar to that of the terminal and the base station of step S810 described in FIG. 8. For example, if a periodic SRS for the terminal 605 has not been configured, the base station 610 may configure a periodic or aperiodic SRS in the terminal 605 based on the request.

Furthermore, the base station 610 may measure an uplink channel from the terminal 605 based on the periodic or aperiodic SRS configuration.

After the terminal 615 requests the SRS configuration information for the terminal 605 from the base station 610, at step S920, the terminal 615 may directly receive the SRS configuration information from the base station 610.

In other words, the base station 610 may transmit, to the terminal 615, newly defined (or configured) SRS configuration information itself for the terminal 605 in response to the request of the terminal 615.

Furthermore, the transmitted SRS configuration information may include information on periodicity in a time domain for the transmission of an SRS, the transmission bandwidth of the SRS, the transmission subframe offset of the SRS, the hopping bandwidth of the SRS, the position of the SRS on a frequency domain, whether the SRS and ACK/NACK are simultaneously transmitted, and a maximum uplink pilot time slot of the SRS.

In this case, the base station 610 may transmit periodic or aperiodic SRS configuration information to the terminal 615 through higher layer signaling.

After the terminal 615 receives the newly defined SRS configuration information from the base station 610, at step S930, the terminal 615 may measure an inter-terminal channel by monitoring an SRS resource transmitted by the terminal 605. In this case, the measurement may mean indirect measurement.

In this case, the operation of the terminal at step S930 may be similar to that of the terminal at step S730 described in FIG. 7.

For example, the terminal 615 may obtain channel information for a channel in which a signal is to be transmitted to the terminal 605 through channel measurement using an SRS, transmitted by the terminal 605, based on reciprocity between an uplink channel and a downlink channel which may be applied to inter-terminal sidelink communication.

Furthermore, unlike in the assumption of FIG. 9, if the terminal 605 tries to transmit a signal to the terminal 615 while it transmits an SRS to the base station 610, the terminal 605 may not u se channel reciprocity. In this case, the terminal 605 may obtain channel information for a channel in which a signal is to be transmitted to the terminal 615 using the same method as a method of measuring an uplink channel.

Furthermore, in various embodiments of the present invention, if the terminal 615 requests, from the base station, SRS configuration information for the terminal 605 for sidelink communication, the base station 610 may transmit only non-precoded SRS configuration information in the same manner as the method described in the part of FIG. 7.

Furthermore, in various embodiments of the present invention, if each terminal (or vehicle) has a plurality of distributed antennas, the base station 610 may make different an SRS configuration for each distributed antenna in the same manner as the method described in the part of FIG. 7.

In this case, in the same manner as that described above (or in the part of FIG. 7), the terminal 615 may select a distributed antenna of the terminal 605 suitable for inter-terminal communication based on channel measurement information.

Furthermore, the terminal 615 may receive only SRS configuration information for a distributed antenna of the terminal 605 selected by the base station 610 or the terminal 615, and may monitor an SRS resource using the SRS configuration information.

Furthermore, if a periodic SRS and an aperiodic SRS occur at the same time, the terminal 605 may be configured to transmit only the aperiodic SRS. Accordingly, if periodic SRSs are transmitted individually with respect to some of or all the distributed antennas of the terminal 605, the base station 610 may trigger the aperiodic SRS for channel measurement between terminals with respect to a specific (or some) distributed antenna of the terminal 605.

In this case, the triggering of the aperiodic SRS may be performed by the downlink control information format (DCI Format) 0, 4, or 1A in the case of frequency division duple (FDD) or time division duplex (TDD) and may be performed by the DCI Formats 2B or 2C in the case of TDD.

Furthermore, the triggering of the aperiodic SRS may be implicitly performed through signaling between the base station 610 that transmits aperiodic SRS configuration information for the terminal 605 and the terminal 615.

Furthermore, in various embodiments of the present invention, although an aperiodic SRS has been configured, a base station transmits SRS configuration information to a terminal through higher layer signaling. Accordingly, the method proposed in the present invention may be applied to a case where a configured SRS is aperiodic in addition to a case where a configured SRS is periodic. In other words, the method proposed in the present invention is not limited to the type of configured SRS.

Furthermore, in various embodiments of the present invention, if the terminal 615 determines a beam direction for the terminal 605 (or a channel for the terminal 605) by monitoring the SRS resource of the terminal 605 (e.g., step S730 of FIG. 7, step S840 of FIG. 8, step S930 of FIG. 9), only an SRS resource included in some frequency resource may be measured.

In other words, the terminal 615 may configure window duration and measure only some frequency resources of the SRS resources of the terminal 605.

In this case, the window duration may be pre-configured for each relation between an uplink resource and a sidelink resource. Alternatively, information on the window may be transmitted to terminals using a semi-static method in which the base station 610 uses higher layer signaling (e.g., RRC signaling).

In this case, the some frequency resources may be related to a sidelink resource used for communication between the terminal 605 and the terminal 615.

The terminal 615 can measure only an SRS uplink resource contiguous to a sidelink, used for communication between the terminal 605 and the terminal 615, through measurement using the window duration. Accordingly, the terminal 615 can reduce measurement overhead.

FIG. 10 shows an operational flowchart of a terminal that measures an inter-terminal channel using an SRS according to various embodiments of the present invention. FIG. 10 is merely for convenience of description, and does not limit the scope of the present invention.

Referring to FIG. 10, a first terminal may mean the terminal 615 of FIG. 6, a second terminal may mean the terminal 605 of FIG. 6, and a base station may mean the base station 610 of FIG. 6. In other words, the second terminal may mean a terminal that transmits an SRS to the base station. The second terminal may mean a terminal that wants to transmit a signal (control signal and/or data signal) to the first terminal.

At step S1010, the first terminal may transmit, to the base station, a first message to request SRS configuration information for the second terminal.

In this case, if each of the first terminal and/or the second terminal includes a plurality of distributed antennas (e.g., distributed antennas), the first message may include SRS configuration information for a specific antenna, among the plurality of antennas, and ID information (e.g., distributed antenna index) of the specific antenna.

In other words, the first terminal may select a specific antenna among the antennas of the second terminal, and may request the SRS configuration information.

In this case, the SRS configuration information may be differently configured for each of the plurality of antennas.

Furthermore, the operational procedure of the first terminal at step S1010 of FIG. 10 is similar to the operational procedure of the terminal described at step S710 of FIG. 7, at step S810 of FIG. 8, and at step S910 of FIG. 9.

After the first terminal transmits the first message to the base station, at step S1020, the first terminal may receive, from the base station, a second message including at least one of the SRS configuration information for the second terminal or the ID information of the second terminal.

For example, if a periodic SRS has not been configured for the second terminal, the first terminal may receive, from the base station, periodic SRS configuration information for the second terminal.

In this case, the operational procedure of the first terminal at step S1020 of FIG. 10 is similar to the operational procedure of the terminal at step S720 of FIG. 7.

For another example, if a periodic SRS has not been configured for the second terminal, the first terminal may receive, from the base station, ID information (e.g., the C-RNTI of the second terminal) of the second terminal and/or SRS configuration information for the second terminal. In this case, the SRS configuration information may be at least one of periodic SRS configuration information or aperiodic SRS configuration information.

Furthermore, in this case, the operational procedure of the first terminal at step S1020 of FIG. 10 is similar to the operational procedure of the terminal at step S820 of FIG. 8 and step S920 of FIG. 9.

In this case, if the first terminal receives the ID information of the second terminal, the first terminal may receive, from the base station, a third message that configures a resource in which at least one SRS is to be transmitted in the second terminal, using the received ID information.

In other words, the first terminal may overhear contents in which the base station configures an SRS resource in the second terminal using the ID information of the second terminal.

In this case, the first terminal may operate similar to the terminal at step S830 of FIG. 8.

Furthermore, the first terminal may identify the SRS configuration information of the second terminal using the third message. In other words, the first terminal may obtain information on an SRS transmission bandwidth, SRS transmission periodicity, and an SRS allocation frequency domain, which are configured by the base station with respect to the second terminal using the ID information of the second terminal.

Furthermore, the SRS configuration information for the second terminal included in the second message may include configuration information of an SRS corresponding to a specific antenna selected by the base station, among the plurality of antennas (e.g., distributed antennas) of the second terminal.

In this case, the base station may select the specific antenna based on a previously measured value of an uplink channel of the second terminal.

Furthermore, the SRS configuration information for the second terminal may include non-precoded SRS configuration information.

After the first terminal receives the second message from the base station, at step S1030, the first terminal may receive at least one SRS from the second terminal using the SRS configuration for the second terminal identified based on the received second message.

In this case, the first terminal may receive an SRS intended for the base station because the first terminal has already obtained the SRS configuration information for the second terminal.

Furthermore, in this case, in order to prevent an SRS from being dropped, the first terminal may receive an SRS that does not overlap an uplink signal transmitted to the base station or a downlink signal received from the base station.

In other words, the first terminal may receive an SRS from the second terminal through a resource that is not used for uplink transmission to the base station or for downlink reception from the base station.

After the first terminal receives at least one SRS from the second terminal, at step S1040, the first terminal may measure a channel with the second terminal using at least one received SRS.

In other words, the first terminal may obtain channel information for a channel which will be used to transmit a signal (control signal or data signal) to the second terminal using the at least one received SRS.

In this case, the channel with the second terminal may be configured based on at least one of unicast service or multicast service between the first terminal and the second terminal.

Furthermore, the first terminal may measure the channel with the second terminal using an SRS transmitted in at least one of specific frequency resources in which at least one SRS is transmitted. In this case, the specific frequency resource may be determined based on a frequency resource now used for a link (e.g., a sidelink) between the first terminal and the second terminal.

Furthermore, in various embodiments of the present invention, the first terminal may select a specific antenna to be used to transmit a signal to the second terminal, among the plurality of antennas of the second terminal, based on information for the measured channel with the second terminal.

Through the above procedures, the first terminal can indirectly measure a channel between the first terminal and the second terminal using an SRS transmitted by the second terminal without an RS resource separately allocated for channel measurement between the first terminal and the second terminal.

General Apparatus to which the Present Invention May be Applied

FIG. 11 illustrates a block diagram of a wireless communication device according to an embodiment of the present invention.

Referring to FIG. 11, the wireless communication system includes a network node 1110 and multiple terminals 1120.

The network node 1110 includes a processor 1111, a memory 1112, and a communication module 1113. The processor 1111 implements the functions, processes and/or methods proposed in FIGS. 1 to 10. The layers of a wired/wireless interface protocol may be implemented by the processor 1111. The memory 1112 is connected to the processor 1111 and stores various types of information for driving the processor 1111. The communication module 1113 is connected to the processor 1111 and transmits and/or receives a radio signal. Particularly, if the network node 1110 is a base station, the communication module 1113 may include a radio frequency (RF) unit for transmitting/receiving a radio signal.

The UE 1120 includes a processor 1121, a memory 1122 and a communication module (or RF unit) 1123. The processor 1121 implements the functions, processes and/or methods proposed in FIGS. 1 to 10. The layers of a radio interface protocol may be implemented by the processor 1121. The memory 1122 is connected to the processor 1121 and stores various types of information for driving the processor 1121. The communication module 1123 is connected to the processor 1121 and transmits and/or receives a radio signal.

The memory 1112, 1122 may be located inside or outside the processor 1111, 1121 and may be connected to the processor 1111, 1121 by various known means. Furthermore, the network node (if it is a base station) 1110 and/or the UE 1120 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The scheme for measuring a channel between terminals in a wireless communication system of the present invention has been illustrated as being applied to the 3GPP LTE/LTE-A system, but may be applied to various wireless communication systems in addition to the 3GPP LTE/LTE-A system.

The invention claimed is:

1. A method of measuring a channel in a wireless communication system, the method performed by a first user equipment comprising:
   transmitting, to a base station, a first message,
   receiving, from the base station, a second message,
   receiving, from a second user equipment, at least one sounding reference signal (SRS) using an SRS configuration for the second user equipment identified based on the received second message, and
   measuring a channel with the second user equipment using the received at least one SRS,
   wherein the SRS is configured to at least one of a periodic SRS or an aperiodic SRS,
   wherein based on the SRS being configured to the aperiodic SRS, the aperiodic SRS is triggered by signaling for a physical downlink control channel (PDCCH) as part of a scheduling grant,
   wherein based on the SRS being configured to the aperiodic SRS, a frequency domain parameter for the aperiodic SRS is configured by higher layer,
   wherein the at least one SRS comprises a non-overlapped SRS with at least one of an uplink signal transmitted to the base station or a downlink signal received from the base station.

2. The method of claim 1, further comprising:
   receiving, from the base station, a third message using the identification information for the second user equipment, wherein the third message is a message through which the base station configures, in the second user equipment, a resource in which the at least one SRS is to be transmitted, and
   identifying the SRS configuration information for the second user equipment using the third message.

3. The method of claim 1,
wherein measuring a channel with the second user equipment comprises measuring the channel with the second user equipment using an SRS transmitted in a specific frequency resource among at least one resource in which the at least one SRS is transmitted,
wherein the specific frequency resource is determined based on a frequency resource currently used in a link between the first user equipment and the second user equipment.

4. The method of claim 1,
wherein if the periodic SRS has not been configured in the second user equipment, the SRS configuration is configured by the base station in response to the request.

5. The method of claim 1,
wherein if each of the first user equipment and the second user equipment comprises a plurality of distributed antennas, the SRS configuration is configured for each antenna.

6. The method of claim 5,
wherein the SRS configuration configured for each antenna comprises at least one of transmission periodicity of an SRS or a subframe offset configured for each antenna.

7. The method of claim 5, further comprising:
selecting a specific antenna to be used to transmit a signal to the second user equipment, among a plurality of antennas of the first user equipment, based on information for the measured channel with the second user equipment.

8. The method of claim 5,
wherein the SRS configuration information for the second user equipment included in the second message comprises configuration information of an SRS corresponding to a specific antenna selected by the base station, among a plurality of antennas of the second user equipment, and
wherein the specific antenna is determined based on a measurement value of an uplink channel of the second user equipment, which is previously measured by the base station.

9. The method of claim 5,
wherein the first message comprises SRS configuration information for a specific antenna, among a plurality of antennas of the first user equipment, and identification information for the specific antenna.

10. The method of claim 1,
wherein the SRS configuration information for the second user equipment comprises non-precoded SRS configuration information.

11. The method of claim 1,
wherein the identification information for the second user equipment comprises a cell-radio network temporary identifier (C-RNTI) of the second user equipment.

12. The method of claim 1,
wherein the first message includes SRS configuration information for the second user equipment, and
wherein the second message comprises at least one of the SRS configuration information for the second user equipment or identification information for the second user equipment.

13. The method of claim 1,
wherein the channel with the second user equipment is configured based on at least one of unicast service or multicast service between the first user equipment and the second user equipment.

14. A first user equipment measuring a channel in a wireless communication system, comprising:
a transmitting/receiving unit for transmitting or receiving radio signals, and
a processor functionally connected to the transmitting/receiving unit,
wherein the processor is configured to:
transmit, to a base station, a first message,
receive, from the base station, a second message,
receive, from a second user equipment, at least one sounding reference signal (SRS) using an SRS configuration for the second user equipment identified based on the received second message, and
measure a channel with the second user equipment using the received at least one SRS
wherein the SRS is configured to at least one of a periodic SRS or an aperiodic SRS,
wherein based on the SRS being configured to the aperiodic SRS, the aperiodic SRS is triggered by signaling for a physical downlink control channel (PDCCH) as part of a scheduling grant,
wherein based on the SRS being configured to the aperiodic SRS, a frequency domain parameter for the aperiodic SRS is configured by higher layer,
wherein the at least one SRS comprises a non-overlapped SRS with at least one of an uplink signal transmitted to the base station or a downlink signal received from the base station.

* * * * *